US009134745B2

(12) United States Patent
Arestov

(10) Patent No.: US 9,134,745 B2
(45) Date of Patent: Sep. 15, 2015

(54) CIRCUIT ARRANGEMENT FOR OPERATING A LOAD HAVING A REACTIVE CHARACTERISTIC

(75) Inventor: Victor Arestov, Wachtberg (DE)

(73) Assignee: Permotors GmbH, Brunn am Gebirge (AT)

( * ) Notice: Subject to any disclaimer, the term of this patent is extended or adjusted under 35 U.S.C. 154(b) by 179 days.

(21) Appl. No.: 13/876,223

(22) PCT Filed: Sep. 27, 2011

(86) PCT No.: PCT/EP2011/004819
§ 371 (c)(1),
(2), (4) Date: Jul. 3, 2013

(87) PCT Pub. No.: WO2012/048798
PCT Pub. Date: Apr. 19, 2012

(65) Prior Publication Data
US 2013/0320901 A1    Dec. 5, 2013

(30) Foreign Application Priority Data

Sep. 27, 2010 (CH) ........................ 1562/10

(51) Int. Cl.
*H02P 23/00* (2006.01)
*G05F 1/70* (2006.01)
*H02J 3/18* (2006.01)

(52) U.S. Cl.
CPC ................. *G05F 1/70* (2013.01); *H02J 3/1835* (2013.01); *H02P 23/0081* (2013.01); *Y02E 40/30* (2013.01)

(58) Field of Classification Search
CPC .................................................. H02P 23/0081
USPC .................................................. 318/438, 558
See application file for complete search history.

(56) References Cited

U.S. PATENT DOCUMENTS

| 1,836,886 | A |   | 12/1931 | Thompson |
| 3,270,270 | A | * | 8/1966 | Yenisey ........................ 363/86 |
| 3,530,370 | A |   | 9/1970 | Yamachi et al. |
| 4,417,187 | A | * | 11/1983 | Bateika ........................ 388/820 |
| 4,532,582 | A | * | 7/1985 | Freeny, Jr. ..................... 363/90 |

FOREIGN PATENT DOCUMENTS

| CN | 1280411 A | 1/2001 |
| CN | 101833059 A | 9/2010 |
| DE | 1201930 B | 9/1965 |

OTHER PUBLICATIONS

International Search Report dated Aug. 2, 2012 for related PCT Application No. PCT/EP2011/004819.

* cited by examiner

*Primary Examiner* — David S Luo
(74) *Attorney, Agent, or Firm* — Howard IP Law Group, PC

(57) ABSTRACT

A circuit arrangement is for operating a load having a reactive characteristic on an AC power supply. The circuit arrangement enables the best possible reactive power compensation, that is, enables operation close to a cos θ of 1, in order to increase the overall efficiency of the arrangement or to achieve optimal energy savings. In order to control critical operating states, a feedback loop is provided that supplies a control current to a further reactive circuit element. This further circuit element is arranged parallel to the load or to the power factor correction capacitor, and is acted upon by a control current such that the control current counteracts a change in the reactive component of the load. The control current is derived from the load current as a variable proportional to the load current. In this way, a reactor for optimizing electromagnetic consumption is created.

20 Claims, 1 Drawing Sheet

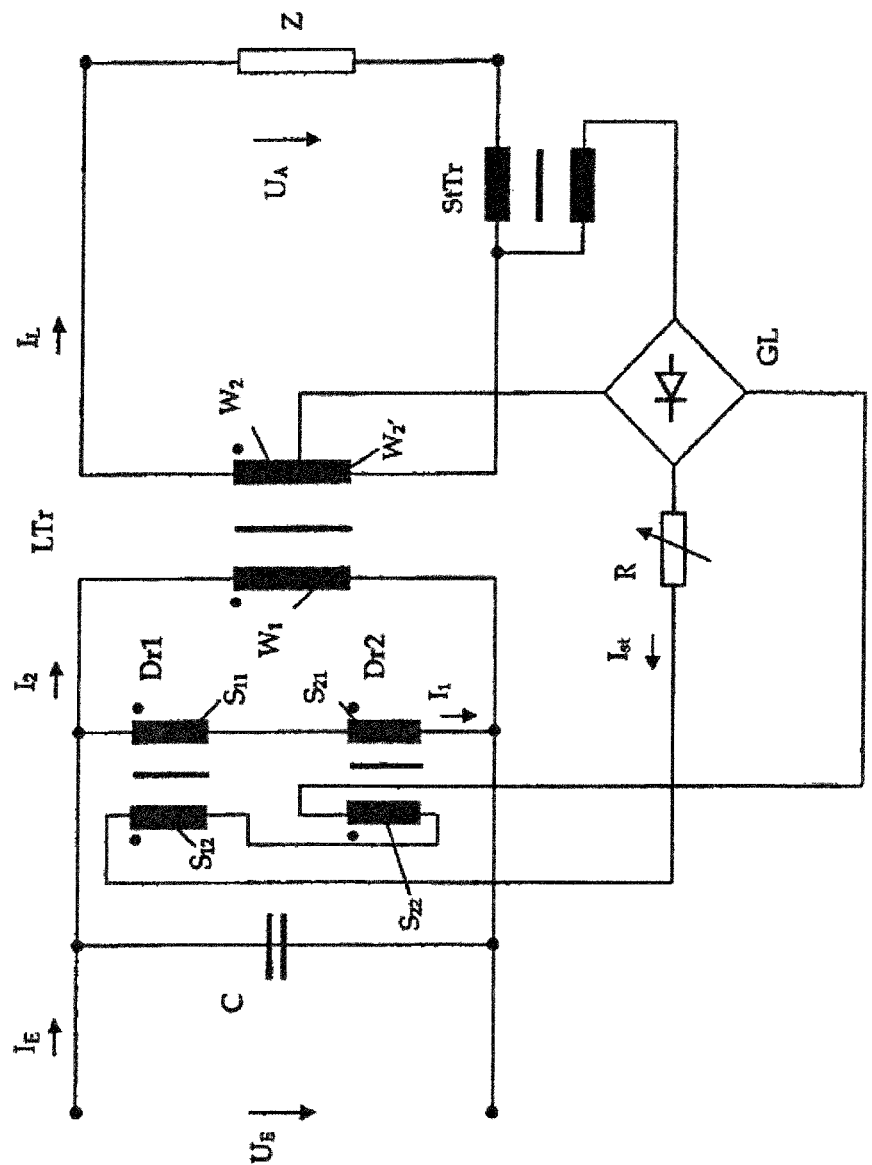

CIRCUIT ARRANGEMENT FOR OPERATING A LOAD HAVING A REACTIVE CHARACTERISTIC

This application is the national stage application under 35 U.S.C. §371 of the International Application No. PCT/EP2011/004819, filed Sep. 27, 2011, which claims the benefit of Swiss Patent Application No. 01562/10, filed Sep. 27, 2010, the entire disclosures of which are incorporated herein by reference in their entireties.

FIELD OF THE INVENTION

The invention relates to a circuit arrangement for operating a load having a reactive characteristic on an AC power supply. It is generally known that in the case of such loads, reactive power compensation is possible by means of reactive elements connected in parallel to the load. In the case of inductive loads, one or more capacitors must be arranged as a counterpart for compensation, and in the case of capacitive loads, inductive elements are provided accordingly.

BACKGROUND

As is known, the basic idea of reactive power compensation is that the reactive power component required by the load need not be provided by the power supplier, which would create a greater burden on the grid, but instead, this reactive power effectively fluctuates back and forth between the load and a reactive compensation element solely on the consumption side.

A disadvantage of known arrangements for reactive power compensation is that these arrangements are not, or are only insufficiently able to respond to changes in the reactive power requirement of the load. In other words the compensation of the reactive power is only designed for a steady operating state of the load, and therefore the compensation itself is static. In so doing, a cos 0 from 0.85 to 0.95 is generally desired.

SUMMARY

It would be desirable to enable the best possible reactive power compensation and to increase the overall efficiency of the arrangement or to achieve an optimal energy savings. In one or more embodiments, the load and the compensation element should be operated in resonance with one another or as close to resonance as possible. In order to control critical operating states, one or more embodiments of the invention provide a feedback loop that supplies a control current to a further reactive circuit element. It is herewith also possible to reduce, and in particular to regulate the power consumption of the load from the power supply network.

Thus according to one or more embodiments of the invention, a circuit arrangement has a further circuit element having a reactive characteristic, which is arranged in parallel to the load or to the power factor correction capacitor, which is supplied with a control current in such a way that this control current counteracts a change in the reactive component of the load, and that the control current is derived from the load current as a variable proportional to the load current. In this way, a reactor for optimizing electromagnetic consumption is created.

In order to attain the above-mentioned optimal reactive power compensation, in the case of a constant frequency of the supply voltage, the magnitude of the reactance of the power factor correction capacitor is preferably equal to or nearly equal to the magnitude of the reactance of the load, wherein in the case of load-induced changes in the impedance of the load, the control current affects the further circuit element in such a way that the parallel connection comprising the load and further circuit element has a reactance that corresponds to the power factor correction capacitor in terms of its value.

In an advantageous embodiment of the invention, a current transformer is used to uncouple the control current. This current transformer is arranged in the load circuit. Here, it is essential that the current transformer be designed in such a way that a linear and in-phase relationship exists between the current flowing on the primary side and voltage induced on the secondary side by this current on the primary side. In the design of the current transformer, it must be ensured that the magnetic core does not reach saturation as a result of the intended nominal current on the primary side.

The further circuit element is an inductor, for example, having coils arranged on a common magnetic core, the coils having opposite polarity, wherein the primary coil is arranged in parallel to the power factor correction capacitor and to the load, and the control current is supplied to the secondary coil.

In an especially efficient embodiment of the invention, the further circuit element is formed by two inductors, the primary coils of which are connected to one another in series. The series-connected primary coils in turn are arranged parallel to the power factor correction capacitor and to the load. The secondary coils are also connected in series and therefore the same control current flows through them. In order to be able to store more magnetic energy, the cores of the inductors preferably feature an air gap.

In order to further increase the above-mentioned efficiency, in a further preferred embodiment of the invention, the arrangement of the secondary coils on the inductor can be selected in such a way that the voltage induced by the control current in the secondary coils is directed such that it counteracts the flow of current in the primary coils of the inductor.

Both of the aforementioned measures result in a minimization of the dissipation power consumed by the further circuit element because the flow of current in the primary coil or the primary coils is kept as minimal as possible.

A rectifier, especially a bridge rectifier, can be connected to the secondary winding of the current transformer on the output side, which in turn, the rectifier is connected to a rheostat on the output side. The rectified, pulsating output voltage of the secondary coil of at least one inductor is supplied via this rheostat. The rheostat thereby serves to modulate and stabilize the compensation operating point.

The circuit arrangement according to one or more embodiments of the invention is suitable for a load that comprises a power transformer having a primary and secondary winding, having at least one device connected to the secondary winding in order to convert electrical active power into mechanical active power, or in order to generate heat. Preferably, a power transformer is used that has an air gap in the ferromagnetic circuit. In addition, the secondary winding of the power transformer can feature a tap that is connected to the rectifier. Alternatively, the load can be formed, with or without the interposition of a power transformer, by a synchronous machine or an asynchronous machine.

Tests performed by the applicant have shown that the circuit arrangement according to the invention operates especially efficiently when the connected load is not operated at its rated power, but with significantly lower values. In particular when using a power transformer, it has been shown that the circuit arrangement operates especially efficiently when the no-load power is at approximately 10% of the nominal power.

Tests performed by the applicant have shown that, compared to the current drawn from the grid, power flows between power factor correction capacitor and load, in other words within the reactor, at a magnitude ten times higher. Moreover tests performed by the applicant have shown that it is possible to achieve an increase in the efficiency of the of the overall arrangement when a further inductance is connected between one of the input terminals of the circuit arrangement and one of the terminals of the power factor correction capacitor in such a way that the further inductance is connected in series to the remaining circuit arrangement. This further inductance can be created by an inductor, a coil, a transformer or by an electric motor. In the tests performed by the applicant, in a particularly efficient embodiment, the further inductance was created by a transformer having a primary and a secondary winding, wherein the primary winding is connected in series to the remaining circuit arrangement and the secondary winding is subjected to a load with an RC element, thus with an ohmic resistance and a capacitance.

It should also be noted that all transformers used in the circuit arrangement according to the invention can be designed as autotransformers.

In the following, the invention is explained with reference to an embodiment shown in the FIGURE.

The FIGURE shows a circuit arrangement according to the invention. This circuit arrangement is connected to the input terminals of an electric power supply and is provided with an AC input voltage $U_E$. A power factor correction capacitor C is connected in parallel to the input terminals and a supply voltage is consequently supplied to that capacitor. In turn, the primary winding $W_1$ of a power transformer LTr is arranged parallel to the power factor correction capacitor C, and a current $I_2$ passes through this winding. The secondary winding $W_2$ of the power transformer LTr features a tap, which forms a winding segment $W_2'$. The winding $W_2$ and the winding segment $W_2'$ constitute an autotransformer. The power transformer has an air gap in its iron or ferrite core.

The output terminals of the secondary winding $W_2$ of the power transformer LTr are connected to the actual load Z. Thus the AC output voltage $U_A$, is applied to the output terminals of the power transformer LTr. A further current transformer StTr, having the load current $I_L$ flows through primary winding thereof, is located in the output circuit of the power transformer, which is formed by the secondary winding $W_2$ and the actual load.

This current $I_L$ induces a voltage in the secondary winding of the current transformer StTr that together with voltage that is tapped at the winding segment $W_2'$, form the input voltage for the rectifier GL. The rectifier GL, which is designed as a bridge rectifier and thereby provides a pulsating DC current, is connected with secondary coils $S_{12}, S_{22}$ of two inductors Dr1 and Dr2 via a rheostat R. A control current $I_{st}$ flows through these secondary coils $S_{12}, S_{22}$ of the inductors Dr1 and Dr2.

The primary coils $S_{11}, S_{21}$ of the two inductors Dr1 and Dr2 are connected to one another in series, wherein in turn, the series connection of these two inductors Dr1 and Dr2 is connected in parallel to the power factor correction capacitor C and to the primary winding $W_1$ of the power transformer LTr. The current $I_1$ flows in these two primary coils $S_{11}, S_{21}$ of the inductors Dr1 and Dr2. Both inductors Dr1 and Dr2 have two coils $S_{11}, S_{12}; S_{21}, S_{22}$, which are each arranged on a common magnetic core composed of iron or ferrite. In order to be able to store the magnetic energy well and to prevent the inductors Dr1 and Dr2 from becoming saturated, the cores feature an air gap.

It is now important that the secondary coils $S_{12}, S_{22}$ feature a winding direction wherein the magnetic field induced by the pulsating DC current counteracts the magnetic field created by the current $I_1$, in the primary coils $S_{11}, S_{21}$. Here, this is the case for the inductor Dr2 when a current flows through the primary coil $S_{21}$ that can be represented as a negative half-wave or in other words, when the direction of its current is in the opposite direction to the arrow of $I_1$. The coil $S_{22}$ is connected in such a way that the control current $I_{st}$ induces a voltage in the coil $S_{21}$ that counteracts the portion of the power supply applied to this coil during a half-wave pulse. During the positive half-wave of the current $I_1$, this effect regularly occurs in the inductor Dr1. Thus a control loop or feedback loop is created that ensures that current constantly flows through the primary coils $S_{12}, S_{21}$ in a magnitude that this counteracts the detuning of the parallel resonant circuit formed from the load Z in conjunction with the power transformer LTr and power factor correction capacitor C due to load changes.

In the present embodiment, the load Z is connected to the power supply via the power transformer LTr. Provided the load contains inductive components, this load can also be connected without the interposition of a power transformer. This is especially the case with synchronous machines and asynchronous machines. It should be noted even in that case of no-load operation, because of its air gap, the power transformer LTr can function as a kind of storage coil. It thereby forms the inductive part of the resonant circuit during no-load operation.

The invention claimed is:

1. A circuit arrangement for use in connection with a load having a reactive characteristic on an AC power supply, comprising:
   at least one power factor correction capacitor arranged parallel to the load; and
   a circuit element with a reactive characteristic, the circuit element comprising an inductor having a primary coil on a magnetic core and a secondary coil, in reverse orientation to the primary coil, on the magnetic core, wherein the primary coil is arranged in parallel to the power factor correction capacitor and the load, and the secondary coil is arranged to receive a control current;
   wherein the control current is proportional to a load current and derived from a load current, the control current being coupled to the circuit element to counteract a change in a reactive component of the load.

2. The circuit arrangement according to claim 1, wherein:
   responsive to a constant frequency of a supply voltage, a magnitude of the reactance of the power factor correction capacitor is substantially equal to the magnitude of the reactance of the load, and, responsive to load-dependent changes in an impedance of the load, the control current causes the circuit element to cause the parallel-connected load, power factor correction capacitor and circuit element to have a reactance that corresponds to a reactance of the power factor correction capacitor.

3. The circuit arrangement according to claim 1, further comprising a current transformer arranged in series with the load.

4. The circuit arrangement according to claim 3, further comprising a rectifier coupled to an output of a secondary winding of the current transformer.

5. The circuit arrangement according to claim 1, wherein a voltage induced by the control current in the secondary coil counteracts a current in the primary coil.

6. The circuit arrangement according to claim 1, wherein the magnetic core has an air gap.

7. The circuit arrangement according to claim 6, further comprising: a current transformer arranged in series with the load, the current transformer having a primary and a secondary winding; and a rectifier coupled to an output of the secondary winding of the current transformer, an output of the rectifier being coupled to the secondary coils of the inductors via a rheostat.

8. The circuit arrangement according to claim 7, wherein the power transformer defines an air gap in a ferromagnetic circuit.

9. A circuit arrangement according to claim 7, wherein the secondary winding of the power transformer comprises a tap connected to the rectifier.

10. The circuit arrangement according to claim 1, wherein the circuit element comprises two inductors having: (a) primary coils connected in series, the series-connected primary coils being arranged in parallel to the power factor correction capacitor and to the load; and (b) secondary coils connected in series and arranged to receive the control current.

11. The circuit arrangement according to claim 10, wherein the load comprises a power transformer having a primary and a secondary winding, and further comprising a device, connected to the secondary winding of the power transformer, for generating mechanical power or heat.

12. The circuit arrangement according to claim 1, wherein the load is defined by a synchronous machine.

13. The circuit arrangement according to claim 1, wherein the load is defined by an asynchronous machine.

14. The circuit arrangement according to claim 1, further comprising an input terminal;
wherein an inductive element is arranged between the input terminal of the circuit arrangement and a terminal of the power factor correction capacitor, the inductive element being connected in series with the parallel connected power factor correction capacitor and circuit element.

15. The circuit arrangement according to claim 14, wherein the inductive element comprises one of an inductor, a coil, a transformer or an electric motor.

16. The circuit arrangement according to claim 14, wherein the inductive element comprises a transformer having a primary and a secondary winding, wherein the primary winding is connected in series to the parallel-connected power factor correction capacitor and circuit element, and the secondary winding is loaded by an RC element.

17. A circuit for use in connection with a load having a reactive characteristic on an AC power supply, comprising:
a load having a load current;
a current transformer arranged in series with the load;
a power factor correction capacitor arranged parallel to the load; and
a circuit element with a reactive characteristic arranged parallel to one of the load and the power factor correction capacitor;
wherein a control current proportional to a load current is derived from the load current, the control current being coupled to the circuit element to counteract a change in a reactive component of the load.

18. The circuit according to claim 17, wherein the circuit element comprises two inductors, each of the two inductors having a primary coil, the primary coils being connected to one another in series.

19. The circuit according to claim 18, wherein the series-connected primary coils are arranged in parallel to the power factor correction capacitor and to the load.

20. The circuit according to claim 18, wherein the inductors of the circuit element further comprise secondary coils, the secondary coils being connected to one another in series.

* * * * *